(12) United States Patent
Ohgane (10) Patent No.: US 6,870,677 B2
(45) Date of Patent: Mar. 22, 2005

(54) OPTICAL MATERIAL, OPTICAL ELEMENT, MULTILAYER DIFFRACTION OPTICAL ELEMENT, OPTICAL SYSTEM, AND METHOD OF MOLDING OPTICAL ELEMENT

(75) Inventor: Masanobu Ohgane, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/410,346

(22) Filed: Apr. 10, 2003

(65) Prior Publication Data

US 2003/0197941 A1 Oct. 23, 2003

(30) Foreign Application Priority Data

Apr. 18, 2002 (JP) .................................. 2002-115613
Mar. 13, 2003 (JP) .................................. 2003-068112

(51) Int. Cl.$^7$ .......................... G02B 1/04; G02B 27/44
(52) U.S. Cl. ............................... 359/565; 359/576
(58) Field of Search ...................... 359/570, 565, 359/569, 576; 264/1.1, 1.36, 1.38

(56) References Cited

U.S. PATENT DOCUMENTS

| | | | |
|---|---|---|---|
| 5,035,473 A | 7/1991 | Kuwayama et al. | 359/13 |
| 5,662,951 A | 9/1997 | Greshes | 425/384 |
| 5,879,837 A * | 3/1999 | Yoshinaga et al. | 430/2 |
| 5,898,511 A * | 4/1999 | Mizutani et al. | 359/13 |
| 6,090,332 A * | 7/2000 | Marder et al. | 264/435 |
| 6,157,488 A | 12/2000 | Ishii | 359/569 |
| 6,262,846 B1 | 7/2001 | Nakai | 359/576 |
| 6,426,812 B2 * | 7/2002 | Ichikawa et al. | 359/22 |
| 6,480,332 B1 | 11/2002 | Nakai | 359/566 |
| 2003/0180563 A1 | 9/2003 | Ukuda et al. | 428/515 |

FOREIGN PATENT DOCUMENTS

| | | |
|---|---|---|
| EP | 0 488 627 A2 | 6/1992 |
| JP | 58-162617 | 9/1983 |
| JP | 6-16720 | 1/1994 |
| JP | 9-127321 | 5/1997 |
| JP | 9-127322 | 5/1997 |
| JP | 10-268116 | 10/1998 |
| JP | 11-44808 | 2/1999 |
| JP | 11-44810 | 2/1999 |
| WO | WO 00/49465 A1 | 8/2000 |

OTHER PUBLICATIONS

Michael W. Farn et al., "Diffractive Doublet Corrected On–Axis at Two Wavelengths," 1354 *SPIE* 24–29(1990).

Carmiña Londoño et al., "The Design of Achromated Hybrid Diffractive Lens Systems," 1354 *SPIE* 30–37 (1990).

B. Kippelen et al., "New Highly Efficient Photorefractive Polymer Composite for Optical–Storage and Image–Processing Applications," 29(21) *Electronics Letters* (Oct. 1993).

* cited by examiner

*Primary Examiner*—John Juba, Jr.
(74) *Attorney, Agent, or Firm*—Fitzpatrick, Cella, Harper & Scinto (57) ABSTRACT

An optical element having a diffraction shape uses an optical material comprising at least N-vinylcarbazole, polyvinylcarbazole, and the light polymerization initiator. By using such optical material, it is possible to suppress crystallization of the optical material during molding even at room temperature and appropriately control the dropping amount suited for replica molding. It is possible to provide the optical material also suited for replica molding at room temperature by setting a ratio of N-vinylcarbazole to polyvinylcarbazole, i.e. N-vinylcarbazole/polyvinylcarbazole, to a range between 90/10 and 70/30.

6 Claims, 7 Drawing Sheets

FIG. 4A
CRYSTAL MELT TEMPERATURE

FIG. 4B
CRYSTALLIZATION TEMPERATURE

FIG. 9

OPTICAL MATERIAL, OPTICAL ELEMENT, MULTILAYER DIFFRACTION OPTICAL ELEMENT, OPTICAL SYSTEM, AND METHOD OF MOLDING OPTICAL ELEMENT

BACKGROUND OF THE INVENTION

1. Field of the Invention

The present invention relates to an optical material used for optical elements such as a lens, a filter, a mirror, and a refraction optical element, and more particularly to an optical material with large refractive index dispersion. Further, the present invention relates to an optical element formed by the optical material and a method of forming the optical element.

2. Related Background Art

Conventionally, an optical system comprising a plurality of lenses for refracting a light beam decreases chromatic aberration by combining glass materials with different dispersion characteristics. Objective lenses of a telescope, for example, comprise a positive lens using a small-dispersion glass material and a negative lens using a large-dispersion glass material. These lenses are combined to correct chromatic aberration appearing on an axis. When the lens configuration or the number of lenses is restricted or glass materials to be used are limited, there has been a case where chromatic aberration cannot fully be corrected.

In contrast to the method of decreasing chromatic aberration by combining glass materials as mentioned above, there is disclosed a method of decreasing chromatic aberration by providing a diffraction grating to part of a lens or optical system. For example, the latter method is disclosed in SPIE Vol. 1354 International Lens Design Conference (1990) and the like. In an optical system, it is known that the refraction surface and the diffraction surface cause chromatic aberrations reverse to each other against a light beam having a given reference wavelength. This phenomenon is used to offset both chromatic aberrations and decrease the entire chromatic aberration. Such diffraction optical element can provide the function equivalent to an aspheric lens by continuously changing the cycle of the diffraction grating structure. The use of the lens having such diffraction grating can greatly decrease chromatic aberration.

On a normal refraction surface, one light beam is unchanged after refraction. By contrast, one light beam is diffracted on a diffraction surface and is separated into a plurality of light beams corresponding to the number of orders. When the diffraction optical element is used as an optical system, the grating structure needs to be determined so that the diffracted light beams allow a luminous flux in an available wavelength area to concentrate on a designed specific order. When the light beam concentrates on the specific order, diffraction light intensities are low for the other orders. When the intensity is 0, the diffraction light is not present. On the contrary, when there is a light beam having an order other than the specific order, that light beam forms an image at a position different from the light beam corresponding to the specific order, generating flare. In order to efficiently decrease chromatic aberrations, it is necessary to fully increase the diffraction efficiency of the light beam corresponding to the specific order.

Japanese Patent Application Laid-Open Nos. 9-127321, 9-127322, 11-044808, 11-044810, and the like disclose configurations to determine the grating structure so that the luminous flux in an available wavelength area concentrates on a specific order. These configurations select a plurality of materials having different dispersions and an optimum thickness of each diffraction grating to provide high diffraction efficiency in a wide wavelength range. More specifically, a plurality of different optical materials are laminated on a substrate. On at least one of interfaces therebetween, a relief pattern, a step shape, a kinoform, and the like are formed to configure an intended multilayer diffraction optical element.

According to Japanese Patent Application Laid-Open Nos. 9-127321, 9-127322, 11-044808, 11-044810, however, there is used a combination of materials having relatively low and high refractive index dispersions in order to obtain the configuration having high diffraction efficiency in a wide wavelength range.

More specifically, Japanese Patent Application Laid-Open No. 9-127321 uses a combination of BMS81 (nd=1.64, vd=60.1: manufactured by OHARA) and plastic optical material PC (nd=1.58, vd=30.5: manufactured by TEIJIN CHEMICALS). Japanese Patent Application Laid-Open No. 9-127322 uses a combination of LaL14 (nd=1.6968, vd=55.5: manufactured by OHARA), acrylic resin (nd=1.49, vd=57.7), Cytop (nd=1.34149, vd=93.8: manufactured by ASAHI GLASS CO., LTD.), and PC (nd=1.58, vd=30.5: manufactured by TEIJIN CHEMICALS). Japanese Patent Application Laid-Open Nos. 11-044808 and 11-044810 use a combination of C001 (nd=1.5250, vd=50.8: manufactured by Dainippon Ink & Chemicals, Inc.), plastic optical material PC (nd=1.58, vd=30.5: manufactured by TEIJIN CHEMICALS), PS (nd=1.5918, vd=31.1), PMMA (nd=1.4917, vd=57.4), and BMS81 (nd=1.64, vd=60.1: manufactured by OHARA).

Figure 9:
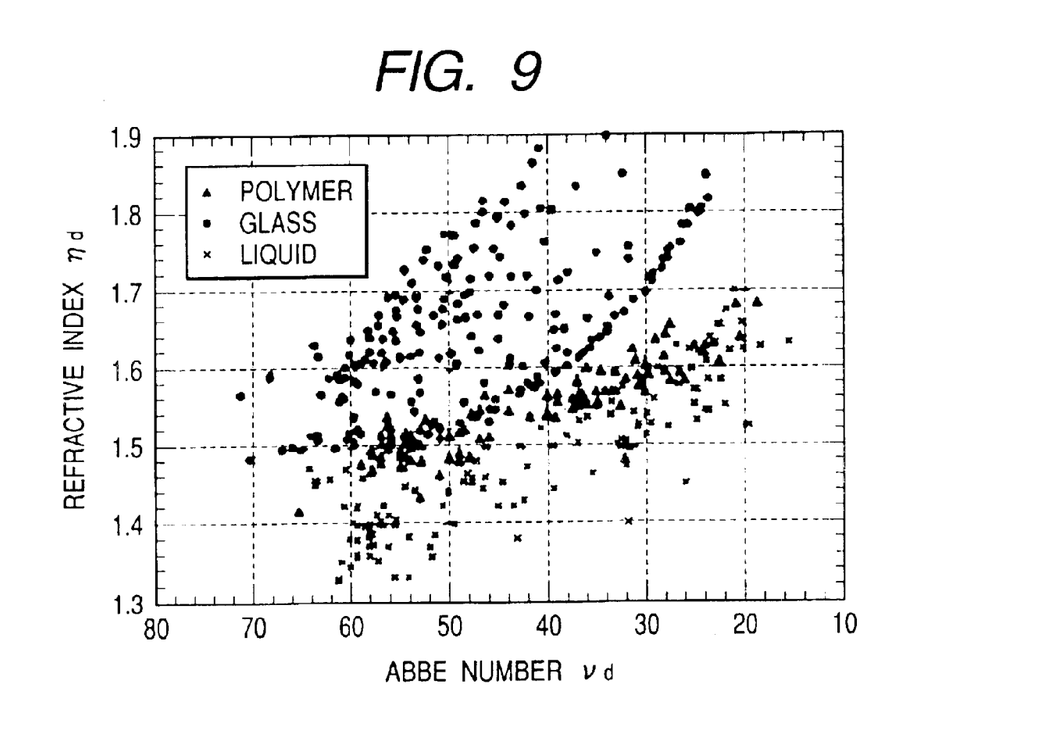
FIG. 9 shows refractive index and Abbe number distribution of optical glass and polymer.

If an optical element such as the diffraction optical element, due to its shape, causes the light to form a large incidence angle (field angle), the light is shaded to generate flare or ghost. In order to increase the field angle, it is necessary to use a material having a refractive index dispersion greater than that for conventional optical materials. FIG. 9 is a graph showing Abbe numbers and refractive indexes of optical materials that are commercially available or under research and development. The ordinate axis indicates a refractive index (nd). The abscissa axis indicates an Abbe number (vd). Of these materials, it is known that polyvinylcarbazole, one of organic polymers, indicates the smallest Abbe number 17.3.

Japanese Patent Application Laid-Open No. 10-268116 describes an example of using polyvinylcarbazole for the multilayer diffraction optical element. In Japanese Patent Application Laid-Open No. 10-268116 lists polyvinylcarbazole as an elastic resin, as seen from table 3. Polyvinylcarbazole, an elastic resin, is pressed against the diffraction grating and is bonded to the surface of the diffraction grating through pressure to be united with it, thus forming a multilayer diffraction grating. Since polyvinylcarbazole is a very fragile material, a small load can easily crack it, for example. Accordingly, polyvinylcarbazole as an elastic resin needs to be pressed to the diffraction grating for a considerably long time in order to form an optical element as described in Japanese Patent Application Laid-Open No. 10-268116. This is industrially very difficult. In recent years, diffraction gratings become finely and complexly shaped, making such method much more difficult.

On the other hand, polyvinylcarbazole can be formed by applying a polymerization reaction to N-vinylcarbazole (vd=17.8). Since N-vinylcarbazole is fluid, the raw material can be easily filled into even gaps of a mold having a complicated diffraction grating structure. Accordingly, it is considered an effective method to use N-vinylcarbazole as an optical material for optical elements having complicated shapes such as a diffraction grating.

Although diffraction optical elements and the like can be molded into any shapes by applying light polymerization, N-vinylcarbazole is crystallized at room temperature and cannot directly be used for replica molding that is usually performed at room temperature.

As one of conventional optical element molding techniques, the replica molding is appropriate for production of large-area moldings and excels in transferability. Due to its ease of molding, the replica molding is suitable for mass production. During the replica molding, photo-curing resin is dropped on a molding surface that is shaped reversely to an intended optical shape. A lens blank is pressed onto the photo-curing resin to spread it. When the photo-curing resin is shaped as intended, light from a light source is applied to cure the photo-curing resin. The cured photo-curing resin is separated from the mold to complete the molding. Generally, however, the replica molding is conducted at room temperature. If the replica molding uses an optical material such as N-vinylcarbazole that crystallizes at room temperature, the crystallization starts on dropping the N-vinylcarbazole into the mold under room temperature and advances while the lens blank is pressed. The optical element cannot be shaped as intended.

A possible solution for the replica molding is to increase a molding temperature higher than the crystallization temperature for suppressing crystallization of the optical material that crystallizes at room temperature (normally 22° to 28° C.). However, molds for the replica molding are generally restricted. Accordingly, the mold and the optical element, when heated, cannot expand freely, causing non-linear expansion. It is very difficult to control shapes. Controlling shapes becomes more difficult when the mold has temperature distribution. In addition, recent optical element shapes are so complicated as to have free curved surfaces or grating forms. Therefore, it is difficult to manufacture a mold in consideration of thermal expansion of the mold and the optical element.

There is another problem about N-vinylcarbazole for its low viscosity. During replica molding, the photo-curing resin is dropped. Conventionally, this process uses a metered-dose discharger called a dispenser. The dispenser drops the photo-curing resin at a constant amount to control the thickness or area of a molded surface. If the resin is dropped at an irregular amount, it is impossible to obtain an intended area or thickness. The resin flows over to the mold side to generate a mold flash. The viscosity of N-vinylcarbazole is low, i.e., 4 mPa·s or lower at the melting point (approximately 65° C.) or higher. It is difficult to control the amount of drops. In order to control the viscosity, adding other compounds such as a thickener adversely affects the refractive index dispersion, degrading the performance.

SUMMARY OF THE INVENTION

It is an object of the present invention to provide an optical material having greater refractive index dispersion capable of suppressing crystallization of the optical material during molding at room temperature and appropriately controlling a dropping amount suited for the replica molding. It is another object of the present invention to provide a method of molding a diffraction optical element, a multi-layer diffraction optical element, an optical system, and an optical element molded with the optical material.

In order to achieve the above-mentioned objects, the present invention provides an optical material, a method of molding an optical element using the optical material, and an optical element molded with the molding method, and an optical system comprising the optical element configured in paragraphs (1) through (10) as follows.

(1) An optical material for molding an optical element through light polymerization, at least comprising: N-vinylcarbazole, polyvinylcarbazole, and a light polymerization initiator.

(2) The optical material according to paragraph (1), wherein the ratio of N-vinylcarbazole to polyvinylcarbazole, i.e. N-vinylcarbazole/polyvinylcarbazole, is set to approximately a range between 90/10 and 70/30.

(3) A method of molding an optical element comprising the steps of: supplying a mold with the optical material according to paragraph (1) or (2); and curing the optical material inside the mold by means of an optical polymerization reaction to mold the optical element.

(4) The molding method according to paragraph (3), wherein viscosity of the optical material is adjusted within a range between 50 and 5000 mPa·s.

(5) The method of molding an optical element according to paragraph (3), wherein the optical polymerization reaction is performed at a temperature ranging from 22° to 28° C.

(6) An optical element comprising an optical member having an intended shape formed of the optical material according to paragraph (1) or (2) and a substrate on which surface the optical member is formed.

(7) A diffraction optical element wherein the optical element according to paragraph (6) has a grating shape.

(8) A multilayer diffraction optical element obtainable by layering the diffraction optical element according to paragraph (7) and at lest one diffraction optical element made of a material with a dispersion differing from the optical material forming the former optical element.

(9) An optical system comprising the optical element according to paragraph (6).

(10) The optical system according to paragraph (9), wherein the optical system is a projection optical system.

(11) The optical system according to paragraph (9), wherein the optical system is an imaging optical system.

The above and other objects of the Invention will become more apparent from the following description taken in conjunction with the accompanying drawings.

DETAILED DESCRIPTION OF THE PREFERRED EMBODIMENTS

Embodiments of the present invention will be described in further detail. The present invention can suppress crystallization during molding at room temperature and appropriately control the dropping amount suited for replica molding by using an optical material comprising N-vinylcarbazole, polyvinylcarbazole, and a light polymerization initiator.

N-vinylcarbazole is a large π-conjugated molecule. Accordingly, N-vinylcarbazole causes electronic coupling between π electrons between molecules and is crystallized at room temperature. This crystallization can be suppressed by adding polyvinylcarbazole to N-vinylcarbazole. The use of polyvinylcarbazole can prevent electronic coupling between π electrons in N-vinylcarbazole.

Other compounds can be also used for simply suppressing crystallization of N-vinylcarbazole. However, N-vinylcarbazole is a material of very high refractive index dispersion. If N-vinylcarbazole is mixed with a compound having a refractive index dispersion lower than that of N-vinylcarbazole, the refractive index dispersion for the entire compound decreases, making it impossible to fully exert the characteristics of N-vinylcarbazole. Polyvinylcarbazole has almost the same refractive index dispersion value as that of N-vinylcarbazole. Accordingly, it is possible to fully exert the characteristics of N-vinylcarbazole without decreasing the refractive index dispersion for the entire compound. Since polyvinylcarbazole is an N-vinylcarbazole polymer, it has no effect on characteristics of a molded optical element.

Further, polyvinylcarbazole is dissolved into an N-vinylcarbazole solution and indicates an appropriate viscosity. A proper viscosity for the replica molding used here ranges from 50 to 5000 mPa·s. When this range of viscosity is used, the dispenser can stably control the dropping amount. If the viscosity is less than 50 mPa·s, a small amount of dropping is difficult. In addition, the optical material scatters from a drop nozzle. If the viscosity exceeds 5000 mPa·s, the optical material becomes thready when dropping from the drop nozzle, making it impossible to stably control the dropping amount.

The ratio of N-vinylcarbazole to polyvinylcarbazole (N-vinylcarbazole/polyvinylcarbazole) preferably ranges from 90/10 to 70/30.

Embodiments of the present invention will be described more specifically with reference to the accompanying drawings.

<First Embodiment>

Figure 1A:
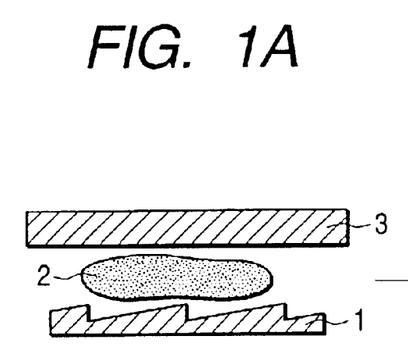
FIGS. 1A, 1B and 1C schematically show a method of molding an optical element according to a first embodiment.
Figure 1B:
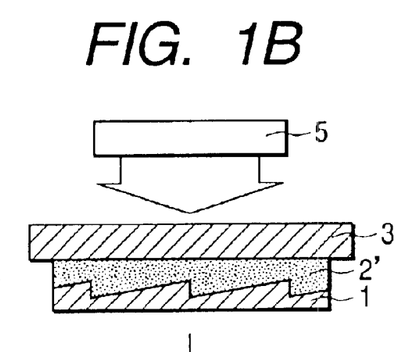
Figure 1C:
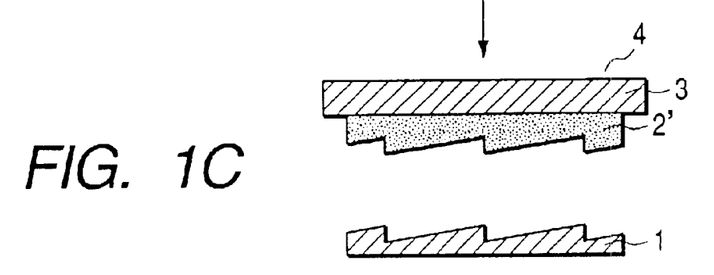

Schematic diagrams in FIGS. 1A to 1C are used to outline a method of molding an optical element according to the first embodiment. As shown in FIG. 1A, a mold 1 is shaped reversely to an intended optical shape and is supplied with a photo-curing resin 2 thereon. A lens blank 3 is pressed onto the photo-curing resin 2' to spread it as shown in FIG. 1B. When the photo-curing resin 2' is shaped as intended, light from a light source 5 is applied to cure the photo-curing resin 2'. Thereafter, as shown in FIG. 1C, the cured photo-curing resin 2' is separated from the mold 1 to produce a diffraction optical element 4. The embodiment describes the grating-shaped diffraction optical element but is not limited thereto. The embodiment can be applied to all optical elements having intended shapes such as fine shapes, free curved surfaces, and the like.

Then, we conducted experiments to demonstrate effectiveness of a mixture of N-vinylcarbazole, polyvinylcarbazole, and a light polymerization initiator as an optical material.

EXAMPLE 1

Figure 2A:
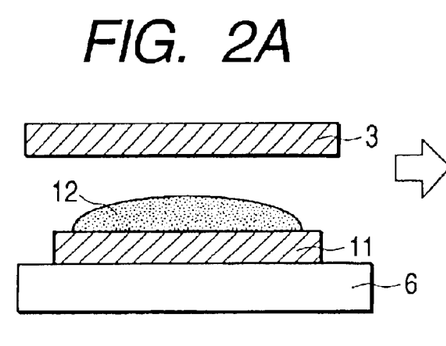
FIGS. 2A, 2B and 2C schematically show an experiment method according to example 1.
Figure 2B:
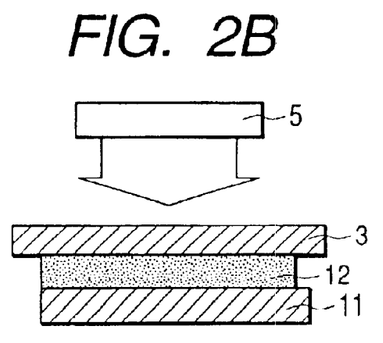
Figure 2C:
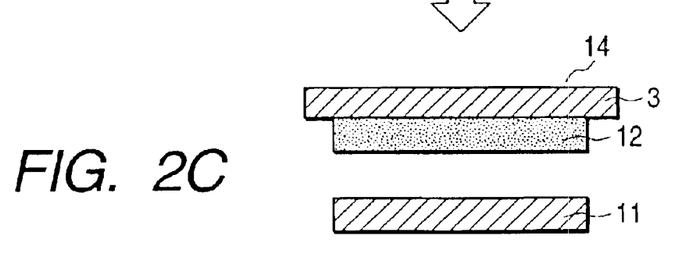

In example 1, were blended 7.9 g of N-vinylcarbazole (manufactured by TOKYO KASEI KOGYO), 1.0 g of polyvinylcarbazole (manufactured by Acros), and 0.1 g of Irgacure 184 (manufactured by Ciba Specialty Chemicals) as a light polymerization initiator. The blend was heated and melted at 80° C. for two hours, and then fully stirred to obtain a photo-curing resin 12. FIGS. 2A to 2C show a method of molding an optical element in example 1. The mutually corresponding parts in FIGS. 2A to 2C and FIGS. 1A to 1C are designated by the same reference numerals. FIGS. 2A to 2C differ from FIGS. 1A to 1C in that a flat mold 11 is used to facilitate the experiment instead of the mold 1 processed into a diffraction grating shape. Consequently, no grating is formed on the molded photo-curing resin. At this time, the viscosity of the photo-curing resin 12 was 71.8 mPa·s (80° C.).

Then, a dispenser was used to discharge approximately 0.04 g of the photo-curing resin 12 kept at 80° C. onto the flat mold 11 kept at 25° C. (experiment example 1), 30° C. (experiment example 2), 40° C. (experiment example 3), and 50° C. (experiment example 4).

The heater 6 controls the mold temperature so as to be within ±1.0° C. All the experiment examples indicated no crystallization of the photo-curing resin 12 discharged onto the mold 11. We placed a 50 μm thick spacer (not shown) on the mold 11. The lens blank 3 was kept at the same temperature as each mold temperature and was placed on the optical material 12. The optical material 12 was filled between the lens blank 3 and the mold 11. Further, ultraviolet light with the center wavelength of 365 nm was applied for 300 seconds at 40 mW from the direction of the lens blank 3 to cure the optical material 12. Finally, the cured optical material 12 was separated from the mold 11 to obtain an optical element 14.

An experiment for comparison example 1 was also conducted according to a similar method.

Comparison Example 1

In comparison example 1, were blended 9.9 g of N-vinylcarbazole (manufactured by TOKYO KASEI KOGYO) and 0.1 g of Irgacure 184 (manufactured by Ciba Specialty Chemicals) as a light polymerization initiator. The blend was heated and melted at 80° C. for two hours, and then fully stirred to obtain an optical material 12.

Then, a dispenser was used to discharge approximately 0.04 g of the optical material 12 kept at 80° C. for the comparison example onto the flat mold 11 kept at 25° C. (comparison experiment example 1), 30° C. (comparison experiment example 2), 40° C. (comparison experiment example 3), and 50° C. (comparison experiment example 4). At this time, the optical material 12 showed the viscosity of 3.8 mPa·S (80° C.).

The temperature of the mold 11 is controlled so as to be within ±1.0° C. When the mold temperatures were set to 25°

C. and 30° C. (comparison experiment examples 1 and 2), the optical material crystallized on being discharged onto the mold 11. The molding failed. When the mold temperatures were set to 40° C. and 50° C. (comparison experiment examples 3 and 4), no crystallization occurred. Then a 50 μm thick spacer was placed on the mold, the lens blank 3 which was kept at the same temperature as each mold temperature was placed on the optical material 12, and the optical material 12 was filled between the lens blank 3 and the mold 11. Further, ultraviolet light with the center wavelength of 365 nm was applied for 300 seconds at 40 mW from the direction of the lens blank 3 to cure the optical material 12. Finally, the cured optical material 12 was separated from the mold 11 to obtain an optical element 14.

Table 1 shows results of the experiment examples 1 through 4 and the comparison experiment examples 1 through 4.

TABLE 1

|  | Mold temperature | Molding result |
|---|---|---|
| Comparison experiment example 1 | 25° C. | Unsuccessful |
| Comparison experiment example 2 | 30° C. | Unsuccessful |
| Comparison experiment example 3 | 40° C. | Successful |
| Comparison experiment example 4 | 50° C. | Successful |
| Experiment example 1 | 25° C. | Successful |
| Experiment example 2 | 30° C. | Successful |
| Experiment example 3 | 40° C. | Successful |
| Experiment example 4 | 50° C. | Successful |

As seen from Table 1, the optical material composed of the blend of N-vinylcarbazole, polyvinylcarbazole, and the light polymerization initiator in Example 1 is capable of molding a good optical element if the mold temperature ranges from 25° C. to 50° C. The optical material in comparison example 1 composed of the blend of N-vinylcarbazole and the light polymerization initiator is capable of molding a good optical element if the mold temperature ranges from 40° C. to 50° C. If the mold temperature is 30° C. or less, the optical material is crystallized and cured immediately when discharged onto the mold, and therefore cannot be molded into an intended shape.

Next, we conducted experiments to demonstrate an effect due to blend ratios of N-vinylcarbazole, polyvinylcarbazole, and the light polymerization initiator in the blend for the optical material.

EXAMPLE 2

In example 2, experiments (experiment examples 5 to 9) were conducted by blending N-vinylcarbazole (manufactured by TOKYO KASEI KOGYO), polyvinylcarbazole (manufactured by Acros), and Irgacure 184 (manufactured by Ciba Specialty Chemicals) as a light polymerization initiator at ratios as shown in Table 2. The experiment method is completely the same as for example 1. The mixture was heated and melted at 80° C. for two hours, and then fully stirred to prepare each optical material for this example. For a comparison purpose, we also conducted comparison experiment example 5 based on a blend ratio as shown in Table 2. Table 3 lists viscosities of the optical materials for examples 5 through 9 and the comparison experiment example.

TABLE 2

|  | Weight (g) of N-vinylcarbazole | Weight (g) of polyvinylcarbazole | Weight (g) of Irgacure 184 |
|---|---|---|---|
| Comparison experiment example 5 | 9.9 | 0.0 | 0.1 |
| Experiment example 5 | 8.9 | 1.0 | 0.1 |
| Experiment example 6 | 7.9 | 2.0 | 0.1 |
| Experiment example 7 | 6.9 | 3.0 | 0.1 |
| Experiment example 8 | 5.9 | 4.0 | 0.1 |
| Experiment example 9 | 4.9 | 5.0 | 0.1 |

TABLE 3

|  | Viscosity (mPa · s) |
|---|---|
| Comparison experiment example 5 | 3.83 |
| Example 5 | 54.7 |
| Example 6 | 544 |
| Example 7 | 5380 |
| Example 8 | 47500 |
| Example 9 | 4490000 |

Then, a dispenser was used to discharge approximately 0.04 g of the optical material kept at 80° C. onto the flat mold 11 kept at room temperature (23° C.). For experiment examples 8 and 9, a spatula was used to drop a proper amount of the optical material onto the mold 11 because the dispenser could not be used for dropping. The mold temperature is controlled so as to be within ±1.0° C. The optical material for comparison experiment example 5 crystallized on being discharged onto the mold. The molding failed. The material for comparison experiment example 5 slightly crystallized but not so much as to become incapable of the molding. No crystallization occurred for experiment examples 6 to 9. Then a 50 μm thick spacer was placed on the mold, the lens blank 3 which was kept at the same temperature as each mold temperature was placed on the optical material 12, and the optical material was filled between the lens blank 3 and the mold 11. Further, ultraviolet light with the center wavelength of 365 nm was applied for 300 seconds at 40 mW from the direction of the lens blank 3 to cure the optical material. Finally, the cured optical material was separated from the mold 11 to obtain the optical element 14.

The optical material composed of the blend of N-vinylcarbazole, polyvinylcarbazole, and the light polymerization initiator in experiment examples 5 through 7 is capable of molding a good optical element. Although the optical material for experiment examples 8 and 9 is capable of molding a good optical element, a dispenser cannot be used for discharging the optical element to the mold. In this case, industrial applications are difficult in consideration of mass-producibility. The optical material composed of N-vinylcarbazole and the light polymerization initiator in comparison example 1 is crystallized and cured immediately when discharged onto the mold, and therefore cannot be molded into an intended shape.

Figure 3:
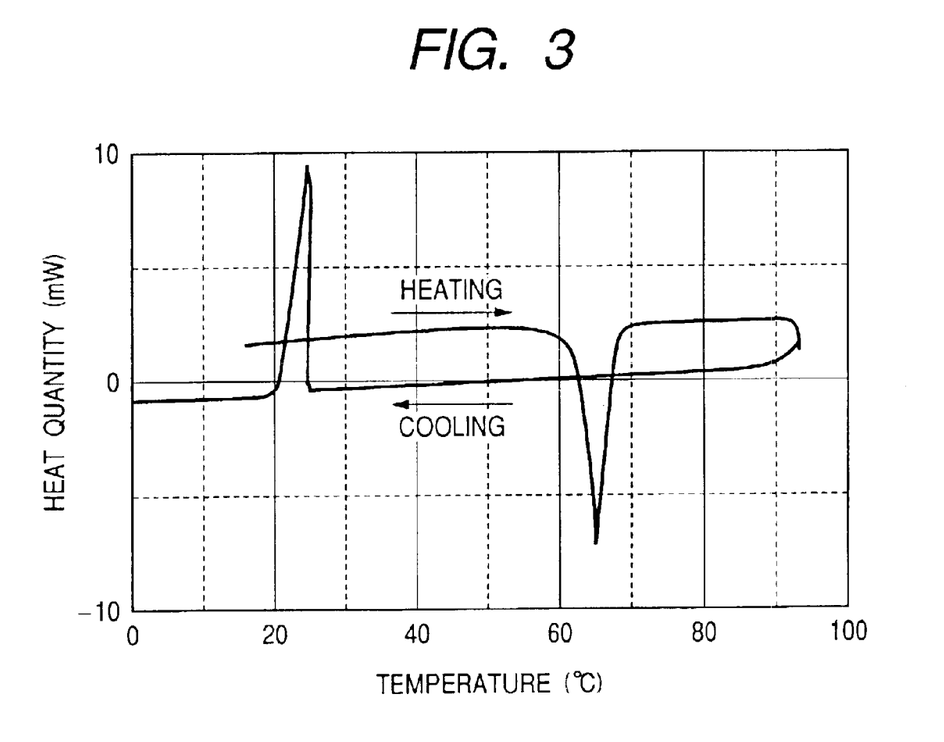
FIG. 3 is a graph showing a result of the differential scanning calorimetry for comparison experiment example 5 according to example 2.

Further, differential scanning calorimetry was conducted for the optical material in comparison experiment example 5. FIG. 3 shows the result. In FIG. 3, the abscissa indicates a temperature and the ordinate indicates a heat quantity. As shown in FIG. 3, the crystal melt temperature is approximately 66° C., and the crystallization temperature is approximately 24° C. in comparison experiment example 5. That is to say, the optical material for comparison experiment example 5 crystallizes at approximately 24° C., namely, at room temperature (22° to 28° C.).

Figure 4A:
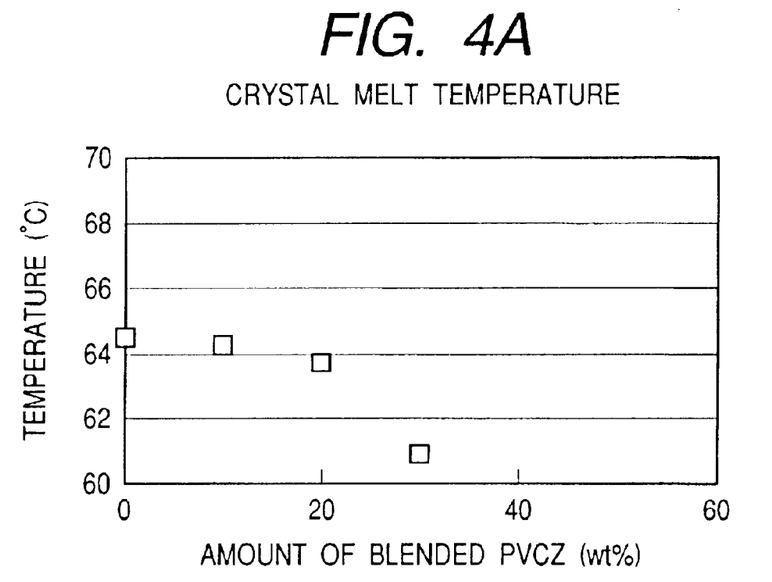
FIGS. 4A and 4B are graphs showing a crystal melt temperature (4A) and a crystallization temperature (4B) according to example 2.
Figure 4B:
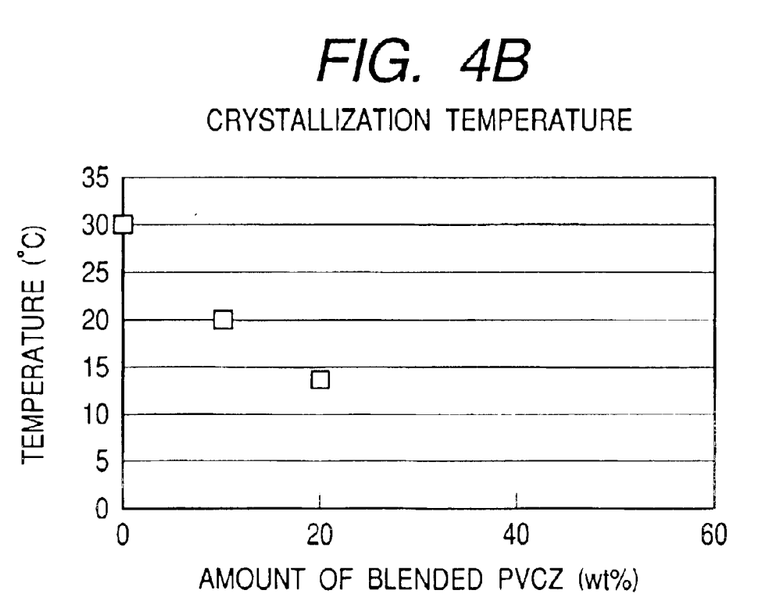

In experiment examples 5 through 9, the same differential scanning calorimetry as for comparison experiment example 5 was conducted. As a result, FIG. 4A shows the crystal melt temperature and FIG. 4B shows the crystallization temperature. No crystallization peak was observed for experiment example 7. Neither crystallization peak nor crystal melt peak was observed for experiment examples 8 and 9. As seen from FIGS. 4A and 4B, the crystal melt temperature and the crystallization temperature decrease as the amount of polyvinylcarbazole increases with reference to N-vinylcarbazole. As seen from FIG. 4B, the crystallization temperature for example 5 is approximately 20° C. and that for example 6 is approximately 14° C.

Accordingly, it is optimal for the optical material to set the value of N-vinylcarbazole/polyvinylcarbazole to approximately a range between 90/10 and 70/30.

The viscosity for the optical material should be optically adjusted to a range between 50 mPa·s and 5000 mPa·s.

<Second Embodiment>

Figure 5:
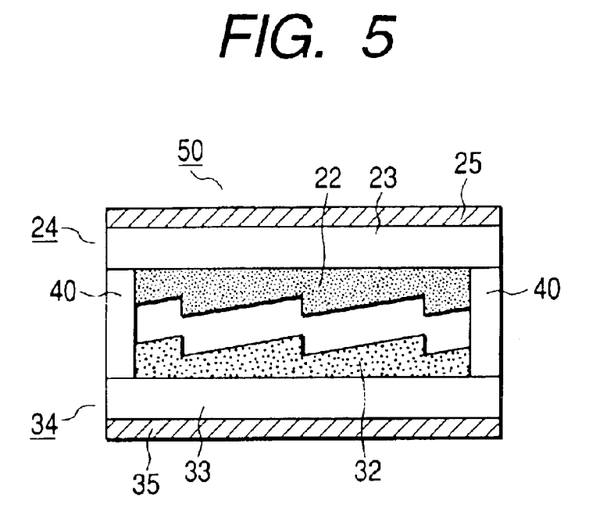
FIG. 5 schematically shows a configuration of a two-layer diffraction optical element according to a second embodiment.

Referring now to FIG. 5, the following describes a configuration of a diffraction optical element according to the second embodiment of the present invention. In FIG. 5, the reference numerals 24 and 34 represent diffraction optical elements having a diffraction configuration. Optical elements 22 and 32 have diffraction grating shapes made of optical materials 22 and 32. Each diffraction grating shape is designed so that a luminous flux in the wavelength area between 400 and 700 nm focuses on a design order. There is a 80 μm pitch between gratings. An optical material 22 is the same as the optical material comprising the blend of N-vinylcarbazole, polyvinylcarbazole, and the light polymerization initiator according to the first embodiment. The grating height is 3.91 μm. An optical element 32 uses GRANDIC RC-8922 (manufactured by Dainippon Ink & Chemicals Inc.) as a photo-curing resin. The grating height is 6.45 μm. The reference numerals 23 and 33 represent lens blanks. The diffraction optical elements 24 and 34 are combined through an intermediate of a spacer 40 so that the corresponding diffraction gratings become opposite to each other to provide a two-layer diffraction optical element 50. Anti-refraction films 25 and 35 are formed on surfaces of the lens blanks 23 and 33 of the two-layer diffraction optical element 50.

The diffraction optical elements 24 and 34 are replica molded in the same method as in FIGS. 1A to 1C indicative of the first embodiment. After the replica molding, anti-refraction films 25 and 35 are formed each on the lens blank side opposite the replica molding surface in order to increase the light beam transmittance (diffraction efficiency) in an available wavelength area. After the anti-refraction films 25 and 35 are formed, the replica molding surfaces of the diffraction optical elements 24 and 34 are faced to each other. The diffraction optical elements 24 and 34 are parallel glued so that the grating tips are symmetrically positioned to give a 1.5 μm interval. The two-layer diffraction optical element 50 is molded in this manner. While the embodiment describes the diffraction optical element having the grating shape, the embodiment is not limited thereto. The embodiment can be applied to all optical elements having intended shapes such as fine shapes, free curved surfaces, and the like.

EXAMPLE 3

In example 3, 7.9 g of N-vinylcarbazole (manufactured by TOKYO KASEI KOGYO), 1.0 g of polyvinylcarbazole (manufactured by Acros), and 0.1 g of Irgacure 184 (manufactured by Ciba Specialty Chemicals) as a light polymerization initiator ware blended. The blend was heated and melted at 80° C. for two hours, and then fully stirred to obtain an optical material 22. Then, a dispenser was used to discharge approximately 0.04 g of the optical material 22 kept at 80° C. onto the mold kept at room temperature. The mold temperature is controlled so as to be within ±1.0° C. Since no crystallization occurred, the lens blank 23 kept at room temperature was gently placed on the optical material. Then, the lens blank 23 was gently pressed to spread the optical material 22 to fill it between the lens blank 23 and the mold. Further, ultraviolet light with the center wavelength 365 nm was applied for 300 seconds at 40 mW from the direction of the glass plate to cure the optical material 22. Finally, the cured optical material 22 was separated from the mold to obtain an optical element 50.

Likewise, GRANDIC RC-8922 was used as an optical material 32. In the same manner as for the optical element 24, the mold was used for placing the lens blank on the optical material, pressing the lens blank thereon, and filling the optical material. Thereafter, ultraviolet light with the center wavelength of 365 nm was applied for 250 seconds at 40 mW from the direction of a lens blank 33 to cure the optical material 32. Finally, the cured optical material 32 was separated from the mold to obtain an optical element 34. The optical elements 24 and 34 were provided with anti-refraction films and were parallel glued to obtain the two-layer diffraction optical element 50.

Figure 6:
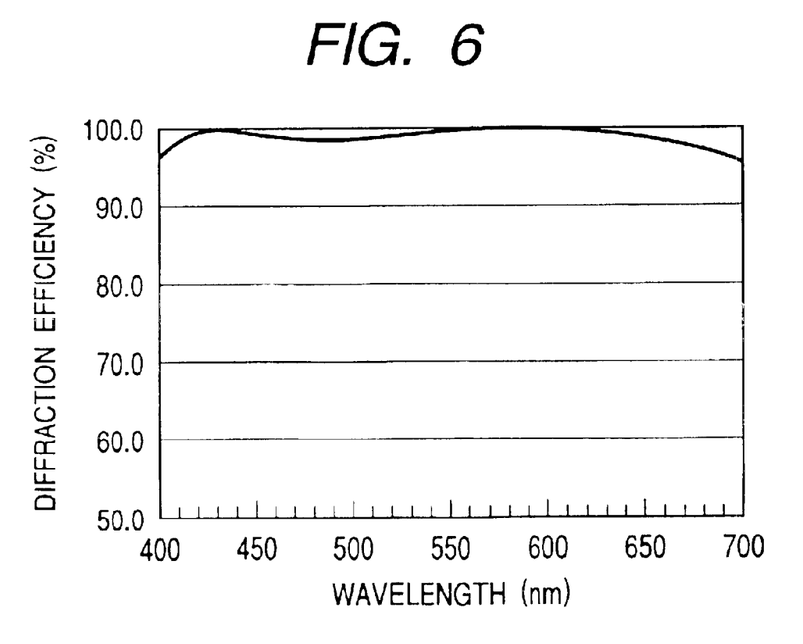
FIG. 6 is a graph showing diffraction efficiency of the two-layer diffraction optical element according to the second embodiment.

FIG. 6 shows the result of measuring the diffraction efficiency of the diffraction optical element 50 according to the example. In FIG. 6, the abscissa represents a wavelength and the ordinate represents the diffraction efficiency at that time. As seen from FIG. 6, the diffraction optical element 50 provides a high diffraction efficiency of 95% or more in a range of wavelengths between 400 and 700 nm effective for optical elements.

<Third Embodiment>

Figure 7:
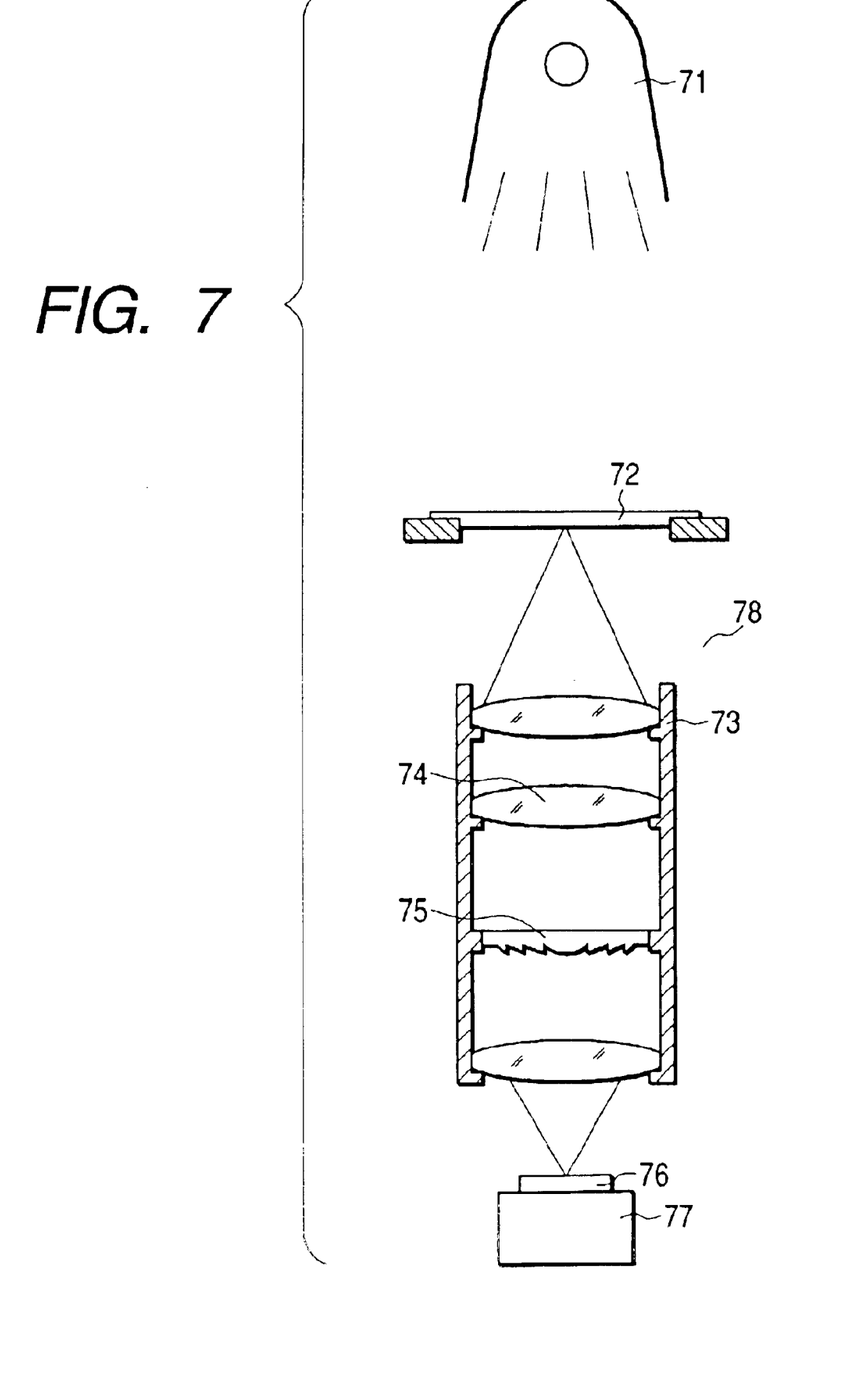
FIG. 7 schematically shows a projection optical system according to a third embodiment.

The third embodiment applies the diffraction optical elements presented in the first and second embodiments to a projection optical system. FIG. 7 shows the projection optical system. In FIG. 7, the reference numeral 71 denotes a light source, 72 a reticle, 73 a lens-barrel of a projection optical system 78, 74 a lens, 75 the diffraction optical element according to the present invention, 76 a wafer, and 77 a wafer stage.

The diffraction optical element 75 is provided so as to correct a chromatic aberration of the lens 74. The wafer stage 77 positions the wafer 76 as specified. A focus detection means (not shown) adjusts the wafer height to the focus position. As the case demands, a detection system (not shown) aligns the reticle against a mark on a layer below already exposed on the wafer. When the focusing and the alignment are complete, a shutter (not shown) opens to emit illumination light from the light source 71 onto the reticle. The projection optical system 78 projects and exposes a circuit pattern on the reticle 72 to a resist on the wafer 76.

The exposed wafer 76 is fabricated into a plurality of elements through a known development or etching process. The optical system having the optical element according to the present invention can be applied to optical equipment for imaging, lighting systems, and the like. Possible candidates for the optical element according to the present invention include not only the diffraction optical element, but also optical elements having intended shapes.

<Fourth Embodiment>

Figure 8:
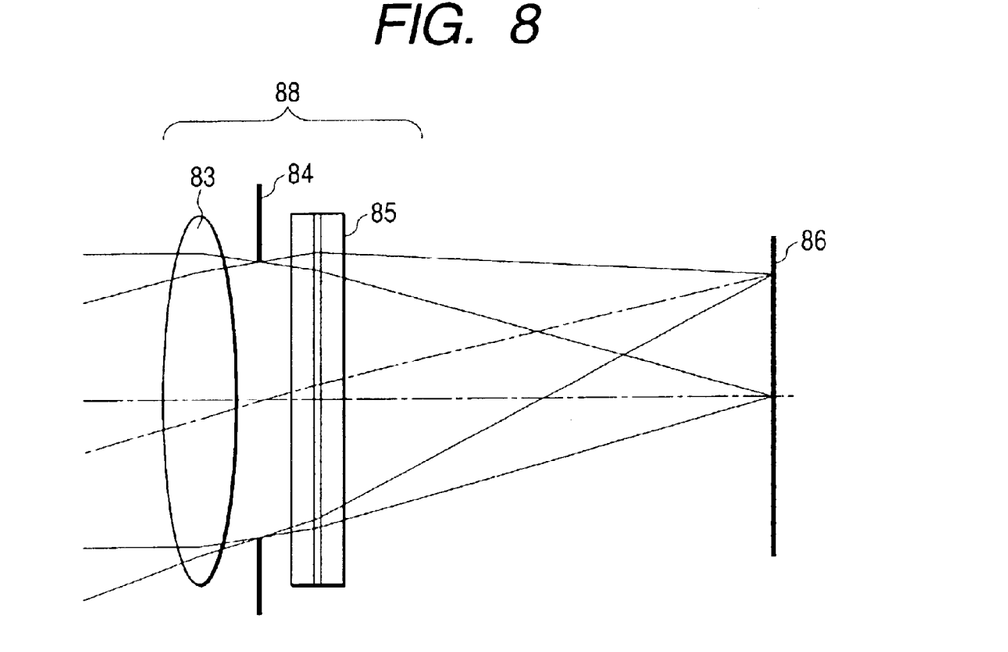
FIG. 8 schematically shows an imaging optical system according to a fourth embodiment.

The fourth embodiment uses the diffraction optical element presented in the first and second embodiments for an imaging optical system. FIG. 8 shows the imaging optical system. In FIG. 8, an imaging optical system 88 has at least one diffraction optical element 85, refraction optical element 83, and diaphragm 84. FIG. 8 shows how a luminous flux enters the imaging optical system 88 from an object and is focused onto a light receiving section (imaging means) 86.

The aberration correction is applied to diffraction light for design orders of the diffraction optical element 85 so that a combination of the diffraction optical element 85 and the refraction optical element 83 can provide good optical characteristics. The light receiving section 86 comprises a plurality of light receiving elements having different spectral responsivities. A color image can be obtained by synthesizing images from such light receiving elements having different spectral responsivities. Possible candidates for the light receiving section 86 generally include CCDs, silver films, photo conductors, and human eyes.

As mentioned above, the optical material according to the present invention comprises at least N-vinylcarbazole, polyvinylcarbazole, and the light polymerization initiator. By using such optical material, it is possible to suppress crystallization of the optical material during molding even at room temperature and appropriately control the dropping amount suited for replica molding.

It is possible to provide the optical material also suited for replica molding at room temperature by setting the ratio of N-vinylcarbazole to polyvinylcarbazole, i.e. N-vinylcarbazole/polyvinylcarbazole, to approximately a range between 90/10 and 70/30.

What is claimed is:

1. An optical element comprising:
   an optical member having an intended shape formed of an optical material comprising N-vinylcarbazole, polyvinylcarbazole and a light polymerization initiator; and
   a substrate on which surface the optical member is formed,
   wherein a ratio of the N-vinylcarbazole to the polyvinylcarbazole (N-vinylcarbazole/polyvinylcarbazole is from 90/10 to 70/30.

2. The optical element according to claim 1, wherein the intended shape formed of the optical material is a grating.

3. An optical system comprising the optical element according to claim 2.

4. The optical system according to claim 3, wherein the optical system is a projection optical system.

5. The optical system according to claim 3, wherein the optical system is an imaging optical system.

6. A multilayer diffraction optical element comprising:
   a first diffraction optical element comprising an optical member having a diffraction shape formed of an optical material and a substrate on which surface the optical member is formed; and
   a second diffraction optical element comprising an optical member having a diffraction shape made of a material with a dispersion differing from the optical material forming the first diffraction optical element and a substrate on which surface the optical member is formed,
   wherein the optical material in the first diffraction optical element comprises N-vinylcarbazole, polyvinylcarbazole and a light polymerization initiator, and wherein the second diffraction optical element is fixed to the first diffraction optical element in a layered fashion.

* * * * *

UNITED STATES PATENT AND TRADEMARK OFFICE
CERTIFICATE OF CORRECTION

PATENT NO. : 6,870,677 B2
DATED : March 22, 2005
INVENTOR(S) : Masanobu Ohgane

It is certified that error appears in the above-identified patent and that said Letters Patent is hereby corrected as shown below:

Title page,
Item [57], ABSTRACT,
Line 10, "i.e." should read -- i.e., --.

Column 2,
Line 47, "In" should be deleted.

Column 4,
Line 13, "i.e." should read -- i.e., --; and
Line 36, "lest" should read -- least --.

Column 8,
Line 44, "comparison" should be deleted.

Column 11,
Line 38, "i.e." should read -- i.e., --.

Column 12,
Line 11, "(N-vinylcarbazole/polyvinylcarbazole" should read -- (N-vinylcarbazole/polyvinylcarbazole) --.

Signed and Sealed this

Twentieth Day of September, 2005

JON W. DUDAS
*Director of the United States Patent and Trademark Office*